United States Patent
Liang et al.

(10) Patent No.: US 12,057,944 B2
(45) Date of Patent: Aug. 6, 2024

(54) METHOD AND DEVICES FOR HYBRID AUTOMATIC REPEAT REQUEST

(71) Applicant: NEC CORPORATION, Tokyo (JP)

(72) Inventors: Lin Liang, Beijing (CN); Fang Yuan, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 600 days.

(21) Appl. No.: 17/291,226

(22) PCT Filed: Nov. 8, 2018

(86) PCT No.: PCT/CN2018/114659
§ 371 (c)(1),
(2) Date: May 4, 2021

(87) PCT Pub. No.: WO2020/093336
PCT Pub. Date: May 14, 2020

(65) Prior Publication Data
US 2021/0376963 A1   Dec. 2, 2021

(51) Int. Cl.
*H04L 1/1829* (2023.01)
*H04L 1/1812* (2023.01)
(Continued)

(52) U.S. Cl.
CPC .......... *H04L 1/1854* (2013.01); *H04L 1/1812* (2013.01); *H04L 1/1858* (2013.01); *H04L 1/1861* (2013.01); *H04W 72/23* (2023.01)

(58) Field of Classification Search
CPC ....... H04L 1/18; H04L 1/1812; H04L 1/1825; H04L 1/1829; H04L 1/1854;
(Continued)

(56) References Cited

U.S. PATENT DOCUMENTS 9,537,613 B2 * 1/2017 Palanki ................ H04L 1/1893
2009/0259910 A1 * 10/2009 Lee ................... H04W 74/0833
714/748
(Continued)

FOREIGN PATENT DOCUMENTS

CA   3056577 A1   9/2018
CN   102090087 A   6/2011
(Continued)

OTHER PUBLICATIONS

LG Electronics, "Discussion on DCI contents", 3GPP TSG RAN WG1 Meeting #89, R1-1707632, Hangzhou, P.R. China, May 15-19, 2017 (3 pages total).
(Continued)

*Primary Examiner* — Jenee Holland
(74) *Attorney, Agent, or Firm* — Sughrue Mion, PLLC

(57) ABSTRACT

Embodiments of the present disclosure relate to methods, devices, and computer readable medium for hybrid automatic repeat request (HARQ). A method in a terminal device comprises: receiving a scheduling message from a network device, the scheduling message including information on HARQ feedback, wherein the information on HARQ feedback indicates at least one of: a processing identification for HARQ feedback and the accumulated number of scheduling messages that have been transmitted for the terminal device or the processing identification; detecting data from the network device according to the scheduling message; and transmitting HARQ feedback to the network device based on the information on HARQ feedback.

12 Claims, 6 Drawing Sheets

(51) Int. Cl.
  *H04L 1/1867* (2023.01)
  *H04W 72/23* (2023.01)
(58) Field of Classification Search
  CPC ... H04L 1/1858; H04L 1/1861; H04L 5/0053; H04L 5/0055
  See application file for complete search history.

(56) References Cited

U.S. PATENT DOCUMENTS

| | | | | |
|---|---|---|---|---|
| 2012/0044892 A1* | 2/2012 | Guan | ............... | H04W 72/121 |
| | | | | 370/329 |
| 2013/0016686 A1* | 1/2013 | Li | ............... | H04L 1/1822 |
| | | | | 370/329 |
| 2013/0022011 A1* | 1/2013 | Enomoto | ............... | H04L 1/0026 |
| | | | | 370/329 |
| 2013/0242816 A1* | 9/2013 | He | ............... | H04N 21/6405 |
| | | | | 370/280 |
| 2014/0161090 A1* | 6/2014 | Lee | ............... | H04L 1/1874 |
| | | | | 370/329 |
| 2014/0355493 A1* | 12/2014 | Niu | ............... | H04L 12/189 |
| | | | | 370/312 |
| 2015/0195850 A1* | 7/2015 | Quan | ............... | H04L 1/1864 |
| | | | | 370/329 |
| 2015/0270932 A1* | 9/2015 | Agiwal | ............... | H04L 5/0055 |
| | | | | 370/336 |
| 2016/0128055 A1* | 5/2016 | Xiong | ............... | H04L 1/1861 |
| | | | | 370/329 |
| 2016/0198450 A1* | 7/2016 | Wei | ............... | H04L 1/1812 |
| | | | | 370/329 |
| 2016/0270100 A1* | 9/2016 | Ng | ............... | H04L 5/008 |
| 2016/0337088 A1* | 11/2016 | Quan | ............... | H04L 1/1812 |
| 2016/0338044 A1* | 11/2016 | Yang | ............... | H04W 72/20 |
| 2016/0338066 A1* | 11/2016 | Yang | ............... | H04W 72/21 |
| 2017/0111145 A1* | 4/2017 | Höglund | ............... | H04L 1/1896 |
| 2017/0257185 A1* | 9/2017 | Hong | ............... | H04L 1/1825 |
| 2017/0273056 A1* | 9/2017 | Papasakellariou | .. | H04W 52/146 |
| 2017/0303248 A1* | 10/2017 | Chatterjee | ............... | H04W 72/23 |
| 2018/0006791 A1* | 1/2018 | Marinier | ............... | H04L 1/0061 |
| 2018/0027547 A1* | 1/2018 | Lyu | ............... | H04W 72/51 |
| | | | | 370/329 |
| 2018/0049234 A1 | 2/2018 | Lee et al. | | |
| 2018/0160425 A1* | 6/2018 | Wiberg | ............... | H04L 1/1864 |
| 2018/0176945 A1* | 6/2018 | Cao | ............... | H04L 5/0044 |
| 2018/0184461 A1* | 6/2018 | Zhang | ............... | H04W 72/044 |
| 2018/0235003 A1* | 8/2018 | Wong | ............... | H04L 1/1671 |
| 2018/0241510 A1* | 8/2018 | Shen | ............... | H04L 1/1621 |
| 2018/0242286 A1* | 8/2018 | Song | ............... | H04L 1/0072 |
| 2018/0249374 A1* | 8/2018 | Park | ............... | H04L 5/00 |
| 2018/0249513 A1* | 8/2018 | Chang | ............... | H04B 7/26 |
| 2018/0270807 A1* | 9/2018 | Salem | ............... | H04W 72/0446 |
| 2018/0270854 A1* | 9/2018 | Lee | ............... | H04L 5/0044 |
| 2018/0302191 A1* | 10/2018 | Park | ............... | H04W 72/23 |
| 2018/0310257 A1* | 10/2018 | Papasakellariou | .. | H04W 52/367 |
| 2019/0268971 A1* | 8/2019 | Talarico | ............... | H04W 76/27 |
| 2019/0356455 A1* | 11/2019 | Yang | ............... | H04L 5/0055 |

FOREIGN PATENT DOCUMENTS

| | | |
|---|---|---|
| EP | 2 469 954 A1 | 6/2012 |
| JP | 2017-208842 A | 11/2017 |

OTHER PUBLICATIONS

Extended European Search Report dated May 10, 2022 from the European Patent Office in EP Application No. 18939620.3.
VIVO, "Discussion on HARQ operation for NR-U", 3GPP TSG RAN WG1 Meeting #95, R1-1812302, Nov. 12-16, 2018, 8pages.
Samsung, "HARQ-ACK codebook determination for eCA", 3GPP TSG RAN WG1 Meeting #82bis, R1-155449, Oct. 5-9, 2015, 12pages.
Huawei et al., "L1 enhancements for URLLC", 3GPP TSG RAN WG1 Meeting #94bis, R1-1810157, Oct. 8-12, 2018, 16pages.
OPPO, "Text proposals for HARG-ACK Transmission", 3GPP TSG RAN WG1 Meeting #94bis, R1-1810982, Oct. 8-12, 2018, 2pages.
International Search Report for PCT/CN2018/114659 dated Aug. 8, 2019 [PCT/ISA/210].
Written Opinion for PCT/CN2018/114659 dated Aug. 8, 2019 [PCT/ISA/237].
Notification of Reasons for Refusal dated Nov. 1, 2022 from the Japanese Patent Office in Application No. 2021-524147.
Ericsson, "HARQ enhancements for NR-U", 3GPP TSG-RAN WG1 Meeting #94 R1-1809206, Aug. 20-24, 2018, pp. 1-7 (8 pages total).
Huawei et al., "HARQ enhancements in NR unlicensed", 3GPP TSG RAN WG1 Meeting #95 R1-1812196, Nov. 12-16, 2018, (14 pages total).

* cited by examiner

METHOD AND DEVICES FOR HYBRID AUTOMATIC REPEAT REQUEST

CROSS REFERENCE TO RELATED APPLICATIONS

This application is a National Stage of International Application No. PCT/CN2018/114659 filed Nov. 8, 2018.

FIELD

Non-limiting and example embodiments of the present disclosure generally relate to a technical field of wireless communication, and specifically to methods and devices for hybrid automatic repeat request (HARQ).

BACKGROUND

This section introduces aspects that may facilitate better understanding of the disclosure. Accordingly, the statements of this section are to be read in this light and are not to be understood as admissions about what is in the prior art or what is not in the prior art.

To improve transmission reliability, a HARQ mechanism has been widely used in communication systems, such as a fourth generation (4G) wireless communication system referred to as Long Term Evolution (LTE) and a fifth generation (5G) wireless communication system called New Radio (NR), which are developed by the third generation partnership project (3GPP).

In HARQ, a receiver feeds back a positive acknowledgement (ACK) to a transmitter if data from the transmitter is detected correctly, and a negative acknowledgement (NACK) if the data is not correctly detected. Then the transmitter performs a new transmission or a retransmission depending on whether an ACK or NACK is received from the receiver. Therefore, ACK/NACK feedback (which may also be referred to as HARQ feedback) is important for data transmission scheduling.

SUMMARY

Various embodiments of the present disclosure mainly aim at providing enhanced HARQ feedback mechanism for wireless communication.

In a first aspect of the disclosure, there is provided a method. The method comprises: method for wireless communication, comprising: transmitting a scheduling message to a terminal device, the scheduling message including information on HARQ feedback, the information on HARQ feedback indicating at least one of: a processing identification for HARQ feedback and the accumulated number of scheduling messages that have been transmitted for the terminal device or the processing identification; transmitting data to the terminal device according to the scheduling message; receiving HARQ feedback from the terminal device; and controlling following transmission or retransmission based on the received HARQ feedback.

In a second aspect of the disclosure, there is provided another method. The method comprises: transmitting a scheduling message to a terminal device; transmitting data to the terminal device according to the scheduling message; detecting HARQ feedback from the terminal device; determining a resource identification for a resource where the HARQ feedback is detected, the resource identification comprising an identifier for a resource set group associated with the resource, wherein a resource set group comprises one or more resource sets, and a resource set comprises one or more resources; and controlling following transmission or retransmission based on the received HARQ feedback and the resource identification.

In a third aspect of the disclosure, there is provided still another method. The method comprises: transmitting a coding configuration for HARQ feedback to a terminal device, the coding configuration indicating a type of encoding for static HARQ codebook; transmitting data to the terminal device; detecting HARQ feedback for the data from the terminal device based on the indicated type of encoding; and controlling following transmission or retransmission based on the detected HARQ feedback.

In a fourth aspect of the disclosure, there is provided a method implemented by a terminal device. The method comprises: receiving a scheduling message from a network device, the scheduling message including information on HARQ feedback, the information on HARQ feedback indicating at least one of: a processing identification for HARQ feedback and the accumulated number of scheduling messages that have been transmitted for the terminal device or the processing identification; detecting data from the network device according to the scheduling message; and transmitting HARQ feedback to the network device based on the information on HARQ feedback.

In a fifth aspect of the disclosure, there is provided another method implemented by a terminal device. The method comprises: receiving data from a network device; in response to determining to retransmit a feedback for the data for the ith time, selecting a resource from the ith resource set group, wherein i is a positive integer, a resource set group comprises one or more resource sets, and a resource set comprises one or more feedback resources; and retransmitting the feedback for the data in the selected resource.

In a sixth aspect of the disclosure, there is provided still another method implemented by a terminal device. The method comprises: receiving a coding configuration for HARQ feedback from a network device, the coding configuration indicating a type of encoding for static HARQ codebook; receiving data from the network device; generating HARQ feedback for the data based on the coding configuration; and transmitting the HARQ feedback to the network device.

In a seventh aspect of the disclosure, there is provided an apparatus for wireless communication. The apparatus comprises a processor and a memory. Said memory contains instructions executable by said processor whereby said apparatus is operative to perform a method according to any of the first, second or third aspect of the present disclosure.

In an eighth aspect of the disclosure, there is provided another apparatus for wireless communication. The apparatus comprises a processor and a memory. Said memory contains instructions executable by said processor whereby said apparatus is operative to perform a method according to any of the fourth, fifth or sixth aspect of the present disclosure.

In a ninth aspect of the disclosure, there is provided a computer readable medium with a computer program stored thereon which, when executed by an apparatus, causes the apparatus to carry out the method of any of the first, second or third aspect of the present disclosure.

In a tenth aspect of the disclosure, there is provided a computer readable medium with a computer program stored thereon which, when executed by an apparatus, causes the apparatus to carry out the method of any of the fourth, fifth or sixth aspect of the present disclosure.

Embodiments of the present disclosure may improve HARQ performance, and improve resource efficiency.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Figure 1:
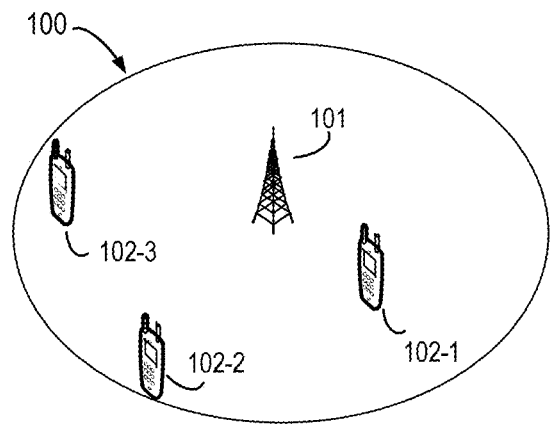
FIG. 1 illustrates an example wireless communication network in which embodiments of the present disclosure may be implemented.

Hereinafter, the principle and spirit of the present disclosure will be described with reference to illustrative embodiments. It should be understood that all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), LTE, NR, wireless local area network (WLAN) standards, such as the IEEE 802.11 standards, and/or any other appropriate wireless communication standard either currently known or to be developed in the future.

As used herein, the term "network device" refers to a network node in a wireless communication network to/from which a terminal device transmits/receives data and signaling. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communications. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehiclemounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

As yet another example, in an Internet of Things (TOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting its operational status or other functions associated with its operation.

As used herein, a downlink (DL) transmission refers to a transmission from a network device to UE, an uplink (UL) transmission refers to a transmission from UE to the network device, and a sidelink (SL) transmission refers to a transmission between UEs.

FIG. 1 illustrates an example wireless communication network 100 in which embodiments of the present disclosure may be implemented. As shown, the communication network 100 may include one or more network devices, for example a network device 101, which may be in a form of an eNB or gNB. It will be appreciated that the network device 101 could also be in a form of a Node B, BTS (Base Transceiver Station), and/or BSS (Base Station Subsystem), access point (AP) and the like. The network device 101 provides radio connectivity to a set of terminal devices, for example terminal devices 102-1, 102-2 and 102-3 which is collectively referred to as "terminal device(s) 102". Though only three terminal devices are shown in FIG. 1 for simplicity, it should be appreciated that more or less terminal devices may be included in the communication network in practice.

A transmission between the network device 101 and a terminal device 102 may be scheduled via a scheduling message, e.g., DL control information (DCI). Upon detecting a DCI for DL scheduling, the terminal device 102 attempts to detect a DL data transmission (e.g., a physical downlink shared channel (PDSCH) transmission) in a resource indicated by the DCI.

Note that the network device 101 may communicate with a terminal device 102 using one or more carriers in one or more frequency bands. The one or more frequency bands may include a licensed frequency band and/or an unlicensed frequency band.

One type of unlicensed band operation known as Licensed Assisted Access (LAA) has been studied and adopted in 3GPP. In a LAA system, control signaling, such as scheduling information in DL and HARQ feedback in UL, are transmitted in a licensed band, while data transmission may be performed in an unlicensed band.

Another type of unlicensed band operation being studied in 3GPP is referred to as NR-unlicensed (NR-U), in which no assistance from a licensed band is available and both data and control transmissions are performed in an unlicensed band.

In an unlicensed band, before transmitting, a node should have clear channel assessment (CCA) first, i.e., Listen before talk (LBT) has to be performed before transmitting. A transmission will be blocked in case LBT fails. Inventors of the present application have realized that failure of the LBT may cause problems in a HARQ mechanism.

With the HARQ mechanism, a receiver (e.g., terminal device 102) feeds back an ACK to a transmitter (e.g., network device 101) if data from the transmitter is detected correctly, and feeds back a NACK otherwise. Then the transmitter performs a new transmission or a retransmission depending on whether ACK or NACK is fed back by the receiver. Therefore, ACK/NACK feedback (also referred to as HARQ feedback) is important for data transmission scheduling.

Errors in the HARQ mechanism may cause failure of ACK/NACK feedback or detection, and as a result, the transmitter is unaware of whether data has been received correctly or not.

It has been observed that due to path loss, channel fading and/or interference, error may occur during data transmission or HARQ feedback, resulting in some problems in the HARQ mechanism, including DL miss detection, DL false alarm, UL miss detection and UL false alarm.

If a DCI is transmitted by a transmitter but not detected by a receiver, DCI miss detection occurs. In such a case, an ACK/NACK feedback is expected by the transmitter but will not be provided by the receiver, causing ambiguity at the transmitter and the receiver sides. Even though the DCI carried in a physical downlink control channel (PDCCH) has high decoding accuracy, it still has a typical decoding error rate of about 1%, which means that miss detect of the DCI cannot be avoided completely.

To solve this problem, for single occasion feedback (i.e., feedback associated with a single PDSCH transmission), discontinuous transmission (DTX) detection may be adopted at the transmitter (e.g., the network device 101) side. For HARQ feedback with multiple occasions multiplexing (i.e., feedback for multiple PDSCH transmissions), a downlink assignment index (DAI) may be included in a DCI to solve the problem caused by DCI miss detection, except for DCI miss detection of last one or more transmission occasions. Based on the DAI field in the DCI, UE becomes aware of a PDCCH which is miss-detected. This ensures that the UE has the same knowledge on length of HARQ-ACK bits to be fed back as the gNB, even though miss detection may happen. For example, with a 2-bits DAI, there will be ambiguity in the size of the feedback (i.e., number of the feedback bits), only when 4 continuous DCIs are missed.

A problem caused by DCI miss detection for the last transmission occasions may be solved by indicating different physical uplink control channel (PUCCH) resources in each DCI, and performing (multiple) blind detections of the ACK/NACK in different PUCCH resources at the transmitter side.

Likewise, when a DCI in PDCCH is not transmitted, but UE detects it, DL false alarm occurs. In such a case, UE feeds back on an unscheduled resource, which may cause interference.

Another HARQ feedback error is referred to as UL miss detection, where ACK/NACK is transmitted by a receiver (e.g., UE) in a PUCCH, but the transmitter (e.g., a gNB) fails to detect it correctly. In particular, a NACK feedback from the UE may not be detected by the gNB, and in such a case, the gNB performs retransmission, but this only has an impact on current transmission occasion. If the NACK is decoded to be ACK by the gNB, then higher layer ARQ may be caused, which reduces transmission efficiency. If an ACK is detected to be NACK or DTX, unnecessary retransmission may also be performed, causing a negative impact on current transmission occasion.

On the other hand, if ACK/NACK is not transmitted, but gNB receives it, UL false alarm occurs. However, it is a rare case, since it happens only when DL miss detection and UL false alarm occur simultaneously.

In some scenarios, HARQ feedback for more than one data transmission (e.g., PDSCH transmission) may be provided via a single UL channel, e.g., a physical uplink control channel (PUCCH) or a physical uplink shared channel (PUSCH). In such cases, more than one ACK/NACK bits may be carried in same PUCCH/PUSCH. Or in other words, one or more PDSCH may be associated with one PUCCH/PUSCH for HARQ feedback, and the PDSCHs associated with same PUCCH/PUSCH may be called a PDSCH set, or a transmission set. The association between the PDSCH (or a DCI scheduling the PDSCH) and the PUCCH/PUSCH may be predetermined or dynamically configured.

In addition, timing and PUCCH resources for HARQ feedback may be indicated through DCI by the transmitter, e.g., a gNB. For example, up to 4 PUCCH resource sets with 8 PUCCH resources per PUCCH resource set may be configured to UE by a radio resource control (RRC) signaling. A PUCCH resource set to be used for ACK/NACK transmission may be selected based on payload of PUCCH bits, and a PUCCH resource to be used within the PUCCH resource set may be further indicated by a DCI.

In 5G NR, HARQ feedback may use one of two modes of codebook, i.e. static codebook or dynamic codebook. With static codebook, all possible timing/association between DCI/PDSCH and PUCCH/PUSCH is considered when generating HARQ bits. This mode of codebook leads to high payload in PUCCH/PUSCH, but may avoid miss detection of DCI, because the payload size (i.e., number of HARQ-ACK bits to feedback) is predefined and static. HARQ feedback for a DCI missed by the receiver is set to NACK, which is the default value.

With dynamic codebook for HARQ feedback, only transmitted PDSCHs are considered when generating HARQ bits, to reduce payload size. In such cases, UE only transmit a HARQ feedback if a DCI is detected, and the content of the feedback, i.e., ACK or NACK, depends on whether PDSCH scheduled by the detected DCI is decoded correctly or not. Therefore, if a DCI is transmitted by the transmitter but not detected by the receiver (i.e., DCI miss detection occurs), an ACK/NACK will not be transmitted, and it may cause ambiguity at the transmitter and the receiver side.

In addition to above problems, operating in an unlicensed band in a NR-U mode may bring more challenges to the HARQ mechanism. For example, LBT failure may block an HARQ feedback transmission from the receiver side, and in such a case, how to make the transmitter be aware of the DTX of the HARQ feedback is an open problem. Furthermore, how to provide the blocked HARQ feedback when resource is available is still to be studied.

In some scenarios, once gNB has accessed a channel in an unlicensed band, a UL transmission from the UE side within the gNB's channel occupied time (COT) can be performed without a further LBT, if a gap between DL transmission from the gNB and the UL transmission from the UE is no larger than a predetermined threshold, e.g., 16 us. Therefore, it may be beneficial for the UE to feedback HARQ-ACK within gNB's COT to avoid block of the HARQ feedback due to LBT failure. Note that either a COT associated with current PDSCH or a COT associated with a following PDSCH may be used for the HARQ feedback for the current PDSCH. However, considering processing delay of the PDSCH at the UE side, it may be infeasible to transmit the HARQ feedback within 16 us in some scenarios.

In current NR systems, problems caused by miss detection of last one or more transmission occasions may be solved by indicating different PUCCH resources in each transmitted DCI. However, this solution does not work well if HARQ feedback bits for a plurality of PDSCH sets have to be transmitted in a single PUCCH/PUSCH channel together. For illustration purpose, it may be assumed that PDSCH set 1 and PDSCH set 2 are to be fed back in a single PUCCH/PUSCH resource, and each PDSCH set includes two PDSCHs. In this example, if the second PDSCH in PDSCH set 1 is miss detected while other PDSCHs are detected correctly, the UE will feedback 3 ACK bits. However, the gNB expects 4 ACK bits, and cannot know that only 3 bits are transmitted by the UE, even if the gNB blindly detects in a plurality of PUCCH resources indicated by DCIs of these PDSCHs.

In addition, when PUCCH carrying ACK/NACK bit(s) is blocked due to failure of LBT in an unlicensed band, it may retransmit the blocked PUCCH in a following PUCCH occasion automatically or based on a DCI trigger. However, when the HARQ-ACK bit length of the blocked PUCCH occasion is uncertain, there will be a big issue in decoding of the following PUCCH.

To solve at least some of the above problems and other problems, methods, devices and computer readable medium have been proposed in the present disclosure. For example, some embodiments may solve problems caused by miss detection of last one or more DCI transmission occasions. Alternatively or in addition, some embodiments may avoid error diffusion due to unexpected miss detection of a DCI.

In some embodiments, one or more of a cycled DAI, a HARQ PUCCH processing ID and a new feedback identifier is included in a scheduling message, e.g., a DCI, to solve problems of ambiguity in payload size of ACK/NACK feedback and/or position of one or more missed PDSCHs and corresponding ACK/NACK bits due to DCI miss detection.

For illustration, a counter DAI or a total DAI together with a cyclic DAI may be included in each DCI, where the counter DAI in a DCI indicates the total number of DCIs that have been transmitted in a PDSCH set (i.e., a set of PDSCH associated with same PUCCH feedback occasion) till current time instance, the total DAI in the DCI indicates the total number of DCIs to be transmitted in a PDSCH set when carrier aggregation is adopted. Total DAI in carrier aggregation can help to solve a problem caused by miss detection of last one or more transmission occasions. However, the total DAI is not present for single carrier deployment. The cyclic DAI indicates the accumulated number of DCIs that have been transmitted (possibly across a plurality of PDSCH sets) for a given UE or a given HARQ-PUCCH processing till current time instance. The combination of the counter DAI/total DAI and the cyclic DAI may avoid ambiguity on payload size of HARQ feedback especially in single carrier deployment where total DAI is not present.

Figure 2:
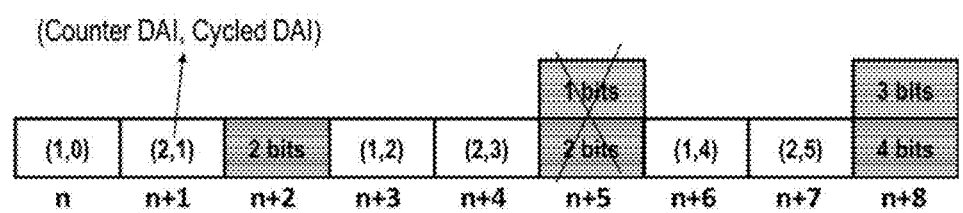
FIG. 2 shows an example for determining a payload size of HARQ feedback based on proposed indications in a DCI according to an embodiment of the present disclosure.

FIG. 2 shows an example for determining the payload size of HARQ feedback based on the proposed indications in a DCI. In this example, PDSCH are transmitted in slots n, n+1, n+3, n+4, n+6 and n+7, and ACK/NACK are feedback in slots n+2, n+5 and n+8. In addition, PDSCHs in slot n and n+1 form PDSCH set 1, PDSCHs in slots n+3 and n+4 form PDSCH set 2, and PDSCHs in slots n+6 and n+7 form PDSCH set 3. A reference sign (i, j) in each slot shown in FIG. 2 represents a counter DAI i and a cyclic DAI j for current slot. In other words, (i, j) means that this is the ith DCI that has been transmitted in current PDSCH set, and the jth DCI that has been transmitted for this UE.

In above example, assuming that 2 ACK/NACK bits for PDSCH in slots n and n+1 are transmitted correctly in slot n+2, DCI in slot n+4 is miss detected and ACK/NACK in slot n+5 is not transmitted due to failure of LBT, then based on the DAIS in the received DCIS, the UE can still determine that totally 4 ACK/NACK bits are to be transmitted in slot n+8. In particular, based on the cyclic DAI of received DCIS in slots n+3, n+6, and n+7 (i.e., 2, 4, 5), the UE knows that one PDSCH transmission between cyclic DAI=2 and cyclic DAI=4 is miss detected, and then there are totally 4 PDSCHs transmitted.

Note that a cyclic DAI means that if the accumulated number of transmitted scheduling messages exceeds the maximum number that can be represented by the cyclic DAI, the number will be reset to 0. For example, the cyclic DAI may have 2 bits and take a value of 0, 1, 2 or 3, then if there are totally 6 DCIS transmitted, the cyclic DAI will be set to a value of 1. In some embodiments, the cyclic DAI may be indicated per UE (which may be identified by a cell Radio Network Temporary Identity (C-RNTI)) or per HARQ-PUCCH processing of the UE. In some embodiments, the cyclic DAI may be reset when a HARQ feedback is successfully received by a gNB.

For a communication system such as NR-U, PUCCH transmission carrying ACK/ANCK feedback may be blocked or fail due to LBT failure. In some scenarios, the probability of LBT failure may even be higher than that of DCI miss detection. Therefore, PUCCH retransmission may be beneficial in the NR-U system. If the PUCCH cannot be retransmitted, the gNB has to treat corresponding PDSCH(s) as NACK and retransmit the PDSCH(s), which is less efficient.

Retransmission of failed PUCCH may use orthogonal resources, i.e., resources different from other transmissions. Alternatively or in addition, in some embodiments, the PUCCH retransmission may be performed by combining the blocked ACK/NACK bits with new ACK/NACK bits and transmitting the combined bits in a resource for the new ACK/ANCK bits. That is, the blocked ACK/NACK bits may be transmitted together with new ACK/NACK bits using a resource for the new ACK/ANCK bits.

The PUCCH retransmission may be determined by the UE automatically, for example based on a result of LBT; however, such automatic PUCCH retransmission may cause error diffusion in some scenarios. In some embodiments, it is proposed to add an additional field in a DCI to indicate whether previous PUCCH is detected, thereby assisting the UE in determining whether to perform PUCCH retransmission.

It has been observed by inventors of the present application that due to processing delay, a DCI may not be able to indicate detecting result of a previous PUCCH. To improve HARQ feedback in such cases, a concept of HARQ-PUCCH processing ID is proposed in some embodiments. The HARQ-PUCCH processing ID indicates an identification of a HARQ PUCCH processing, and may be included in a DCI. This new field in the DCI (potentially together with other indication for PUCCH retransmission), enables UE to only retransmit HARQ-ACK bits with same HARQ-PUCCH processing ID in a following PUCCH transmission occasion. In some embodiments, the maximum number of HARQ-PUCCH processing is determined by the maximum number of new indicated PUCCH occasions between a PDCCH in which the DCI is detected and an indication of the completion (success or failure) of corresponding PUCCH indicated by that DCI. In some embodiments, the maximum number of HARQ-PUCCH processing may be 1. In this case, HARQ-PUCCH processing ID is not needed. However, it requires some restriction on HARQ feedback, for example, UE may not be expected to indicate a new PUCCH occasion before the base station indicating completion (success or failure) of PUCCH transmission(s) in existing PUCCH occasion(s). It means that in some embodiments, an indication of completion of a PUCCH by the base station (e.g., gNB) rather than transmitting time of that PUCCH by UE is considered as an end position of a counting PUCCH-HARQ processing.

Figure 3:
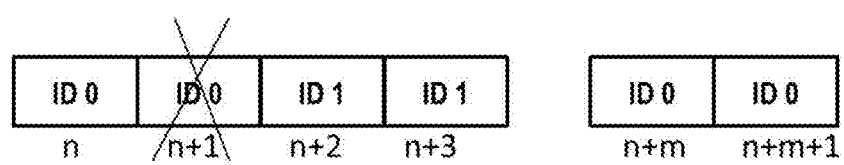
FIG. 3 shows an example for determining ACK/NACK bits to retransmit based on a proposed HARQ-PUCCH processing ID according to an embodiment of the present disclosure.

FIG. 3 shows an example for determining ACK/NACK bits to retransmit based on the proposed HARQ-PUCCH processing ID.

In this example, ACK/NACKs with HARQ PUCCH ID 0 are transmitted in slots n and n+1, but the ACK/NACK transmission in slot n+1 fails, e.g., due to LBT failure. ACK/NACKs with HARQ PUCCH ID 1 are transmitted in slots n+2 and n+3. If ACK/NACK in slot n+3 is not detected, the gNB may indicate the HARQ PUCCH processing ID 0 to UE that UE knows slot n+1 should be retransmitted; otherwise, UE cannot know whether PUCCH in slot n+1 or n+3 should be retransmitted.

Figure 4:
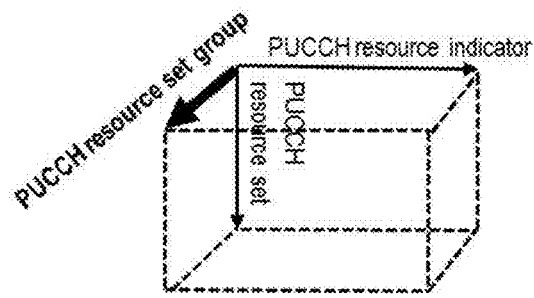
FIG. 4 shows an example of a three dimensional (3D) indication of a resource according to an embodiment of the present disclosure.

Alternatively or in addition, in some embodiments, a concept of PUCCH resource set group is proposed to indicate retransmission property of HARQ feedback, thereby solving problems caused by PUCCH and PDSCH miss detection. For instance, a three-dimensional (3D) indication of a PUCCH resource for HARQ feedback is proposed. The 3D indication comprises an indication for the resource set group, an indication for a resource set and a resource indicator, as shown in FIG. 4. A resource set group may comprise one or more resource sets, and a resource set may comprise one or more feedback resources (e.g., PUCCH resources). The indication of a PUCCH resource set group is a new dimension proposed for selecting a PUCCH resource, e.g., based on a result of LBT. Generally speaking, if a HARQ feedback is to be transmitted/retransmitted for the nth time, a PUCCH resource from resource set group n will be selected, where n is a positive integer. For example, if a PUCCH transmission carrying ACK/NACK bits has failed for two times due to LBT failure, then when the UE retransmits the ACK/NACK bits for the $3^{rd}$ time, it may choose a resource from the $3^{rd}$ PUCCH resource set group to indicate that this is the $3^{rd}$ retransmission. Correspondingly, upon detecting the PUCCH in the $3^{rd}$ resource set group, gNB knows that this is the $3^{rd}$ retransmission, and can determine a PDSCH associated with the ACK/NACK feedback, i.e., determine for which PDSCH the ACK/NACK is fed back.

Within the selected resource set group, a resource set may be selected depending on payload of the ACK/NACK to be fed back. In addition, a PUCCH resource within the selected resource set may be determined for the PUCCH transmission based on an indication included in the DCI of a corresponding PDSCH.

In some embodiments, when the nth PUCCH transmission/retransmission and the mth PUCCH transmission/retransmission are assigned a same PUCCH resource indicator, the ACK/NACK bits of the nth and mth PUCCH transmission/retransmission may be multiplexed together. In addition, UE may select a PUCCH resource set for the combined transmission based on a total length of the combined ACK/NACK bits.

Figure 5:
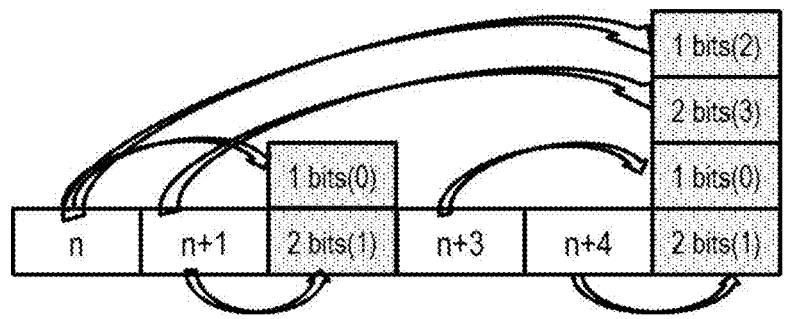
FIG. 5 shows an example for determining a resource for ACK/NACK feedback based on a concept of resource set group according to an embodiment of the present disclosure.

An example for determining a PUCCH resource for ACK/NACK feedback based on the concept of PUCCH resource set group is illustrated in FIG. 5, and an example of resource selection rules are shown in Table 1 below.

TABLE 1

| Slot | n | n + 1 | n + 3 | n + 4 |
|---|---|---|---|---|
| Group 1 | 0 | 1 | 0 | 1 |
| Group 2 | 2 | 3 | 2 | 3 |

In this example, assuming that DCIs for PDSCHs in slot n and n+1 assign a same PUCCH resource indicator for HARQ feedback. Then according to Table 1, if ACK/NACK for PDSCH in slot n is to be transmitted in slot n+2, a resource 0 in group 1 will be selected, since this is the first transmission of the ACK/NACK. If ACK/NACK for PDSCH in slot n+1 is also to be transmitted in slot n+2, it will be multiplexed with the ACK/NACK for PDSCH in slot n, and then a resource 1 in group 1 will be selected, since this is the first transmission and the payload size is 2. If the ACK/NACK for PDSCH in slot n is to be transmitted in slot n+5, a resource 2 in group 2 will be selected, since this is the second retransmission. If ACK/NACK for PDSCH in slot n+1 is also to be transmitted in slot n+5, it will be multiplexed with the ACK/ANCK for PDSCH in slot n, and then a resource 3 in group 1 will be selected, since this is the second transmission and the payload size is 2. Resource for ACK/NACK associated with PDSCH in slots n+3 and n+4 may be derived likewise.

An alternative way for avoiding ambiguity due to DCI miss detection or PUCCH retransmission is to use a static HARQ codebook, which means that payload size for a HARQ feedback transmission is predetermined, for example, based on an association of PDSCH time slots and a feedback time slot. The association/timing may be configured, for example, via RRC signaling.

Regarding static HARQ codebook, it is specified in 3GPP that for UE which received a PDSCH in slot n together with a DCI indicating a feedback slot indexed n+k, if the UE reports HARQ-ACK information for the PDSCH reception in a slot other than slot n+k, it sets a value for each corresponding HARQ-ACK information bit to NACK. Such encoding method reduces detection complexity at the gNB side, and provides good transmission performance. However, inventors of the present disclosure observed that such encoding method provides no redundancy, and may not be suitable, for example, for a PUCCH transmission in an unlicensed band where PUCCH may be blocked due to LBT failure.

Therefore, in some embodiments, it is proposed to configure two types of encoding for static HARQ codebook, which may be referred to type A and type B.

With the type A encoding, as specified in 3GPP, if UE reports HARQ-ACK information for a PDSCH reception in a slot other than slot n+k, the UE sets a value for each corresponding HARQ-ACK information bit to NACK.

In contrast, with the type B encoding, even if UE reports HARQ-ACK information for a PDSCH reception in a slot other than slot n+k (which is the feedback slot indicated in a DCI of the corresponding PDSCH), the UE sets the value for each corresponding HARQ-ACK information bit to its actual value, i.e., a value determined based on PDSCH detection result.

The type (i.e., type A or type B) of encoding to be used for HARQ feedback may be configured by a network device, e.g., a gNB.

Figure 6:
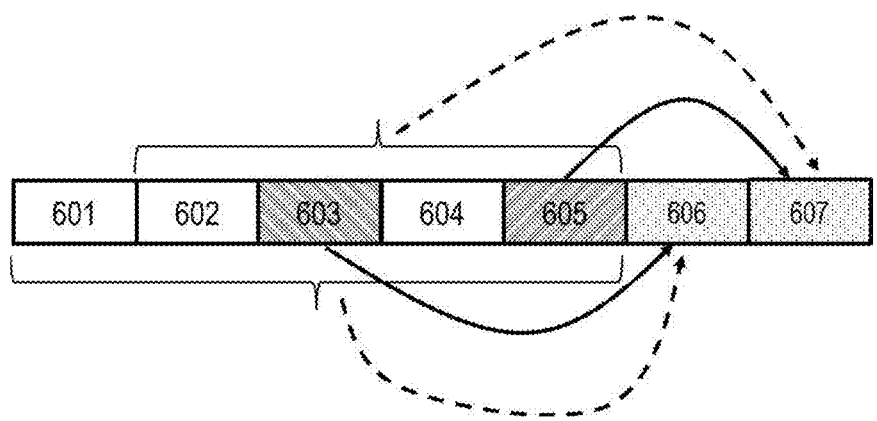
FIG. 6 illustrates schematically examples for type A and type B encoding for HARQ feedback according to an embodiment of the present disclosure.

FIG. 6 illustrates schematically examples for type A and type B encoding for HARQ feedback. As shown in FIG. 6, HARQ feedback for a PDSCH set in slots 601 to 605 may be transmitted in slot 606 according to a timing/association predetermined or configured via RRC signaling, but only DCI for PDSCH in slot 603 indicates that an ACK/NACK is to be fed back in slot 606. Then in slot 606, 5 ACK/NACK bits for slots 601 to 605 will be transmitted, but only the ACK/NACK bit for slot 603 is set to its real value while other bits are set to NACK according to type A encoding. Likewise, if HARQ feedback for a PDSCH set in slots 602 to 605 may be transmitted in slot 607 according to a predetermined timing/association, but only DCI for PDSCH in slot 605 indicates that an ACK/NACK is to be fed back in slot 607, and then in slot 607, 4 ACK/NACK bits for slots 602 to 605 will be transmitted, but only the ACK/NACK bit for slot 605 is set to its real value while other bits are set to NACK. The type A encoding has a good transmission performance but provide no redundant information, and therefore, if PUCCH is slot 606 is missed detected, the value of HARQ feedback for slot 603 is not known to the network device.

The above problem may be solved by type B encoding. With type B encoding, HARQ feedback for a PDSCH set in slots 601 to 605 may be transmitted in slot 606, and all ACK/NACK bits for the slots 601 to 605 are set to their real values. Likewise, HARQ feedback for a PDSCH set in slots 602 to 605 may be transmitted in slot 607, and all ACK/NACK bits are set to their real values. It means that feedbacks for slots 602 to 605 are transmitted in both slot 606 and sot 607. In such a case, even if PUCCH in slot 606 is miss detected, the network device may still recover HARQ feedbacks for slots 602 to 605 from HARQ feedback in slot 607.

Furthermore, for HARQ feedback based on static codebook, gNB may trigger transmission or retransmission of a HARQ feedback by indicating, in a DCI, timing or an offset for PUCCH transmission relative to a slot where the DCI is transmitted.

Figure 7:
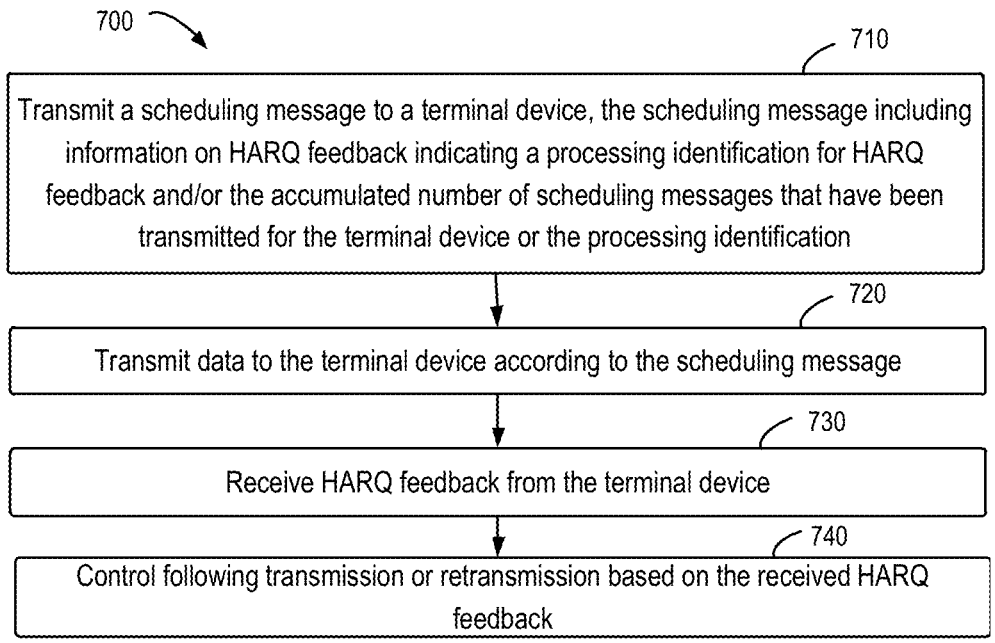
FIGS. 7-9 show flow charts of methods that may be implemented by a network device according to embodiments of the present disclosure.

Reference is now made to FIG. 7, which shows a flow chart of an example method 700 for HARQ feedback. The method 700 may be implemented by a network device, for example, the network device 101 shown in FIG. 1. For ease of discussion, the method 700 will be described below with reference to the network device 101 and the communication network 100 illustrated in FIG. 1. However, embodiments of the present disclosure are not limited thereto. For example, the method may be implemented by a terminal device involved in D2D communication in some scenarios.

As shown in FIG. 7, at block 710, the network device 101 transmits a scheduling message to a terminal device, e.g., one terminal device 102 in FIG. 1. The scheduling message may comprise, e.g., a DCI. In addition, the scheduling message includes information on HARQ feedback. The information on HARQ feedback indicates a processing ID for HARQ feedback (e.g., HARQ PUCCH processing ID) and/or the accumulated number of scheduling messages that have been transmitted for the terminal device or the processing identification. In some embodiments, the accumulated number of scheduling messages may be in a form of cyclic DAI, as shown in FIG. 2.

The processing ID for HARQ feedback and/or the cyclic DAI facilitate the terminal device 102 to determine PDSCH(s) for which ACK/NACK feedback is required, and thereby avoiding ambiguity on payload size of HARQ feedback. Some examples for determining the payload size for HARQ feedback have been described with reference to FIGS. 2-3.

In some embodiments, the scheduling message, e.g., the DCI, may further include one or more of: an indication of the total number of scheduling messages that have been transmitted in a predetermined transmission set (e.g., a PDSCH set) associated with a same HARQ feedback time slot (e.g., in a form of the counter DAI shown in FIG. 2), an indication of the total number of scheduling messages to be transmitted in the predetermined transmission set (e.g., the PDSCH set) associated with a same HARQ feedback time slot (e.g., in a form of the total DAI), and an indication for providing a new HARQ feedback.

The indication for providing a new HARQ feedback may be in a form of a new feedback indicator (NFI) which may be a toggle bit. That is, the NFI in a DCI may indicate whether an expected HARQ-ACK feedback(s) from the UE was received correctly or not by the gNB. For example, if the NFI bit is not toggled, it means that HARQ-ACK occasion(s) since the NFI bit was last toggled was not received. In this case, the UE may automatically include HARQ-ACK bits that were not received correctly in next reporting occasion, i.e., retransmit the HARQ-ACK bit(s). On the other hand, if the NFI bit is toggled, it means that the HARQ-ACK occasion(s) since the bit was last toggled was received by the gNB, and therefore, there is no need to retransmit the HARQ-ACK bit(s).

In some embodiments, a combination of one or more of a cycled DAI, a HARQ PUCCH ID and a NFI may be transmitted in the scheduling message to the terminal device 102 at block 710 to facilitate the HARQ feedback. In addition, the combination may be transmitted together with other information related to HARQ feedback, e.g., a counter DAI and/or a total DAI.

At block 720, the network device 101 transmits data to the terminal device 102 according to the scheduling message. As an example without limitation, the data may be transmitted via a PDSCH.

At block 730, the network device 101 receives a HARQ feedback from the terminal device 102, and at block 740, the network device 101 controls following transmission or retransmission based on the received HARQ feedback. The operation of the controlling transmission/retransmission based on the HARQ feedback may be performed similarly as that in a current communication system. For example, if a NACK is received for a data transmission, then the network device 101 may retransmit the data transmission accordingly. If an ACK is received for a data transmission, the network device 101 may prevent retransmitting the data.

Figure 8:
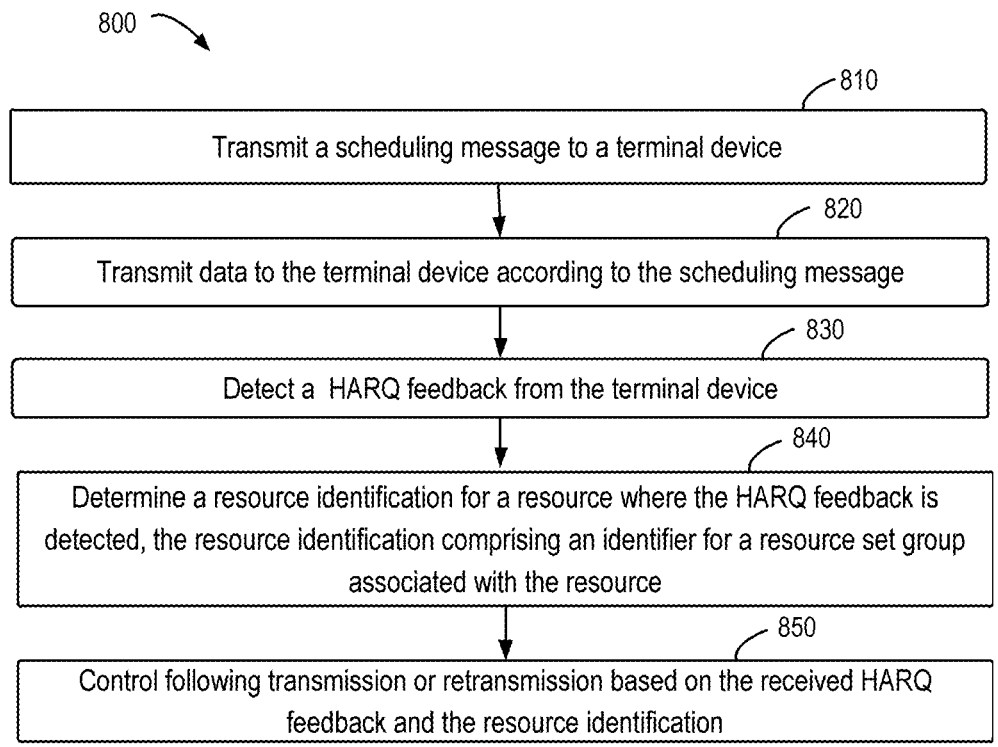

FIG. 8 shows a flow chart of another example method 800 for HARQ feedback. The method 800 may be implemented by a network device, for example, the network device 101 shown in FIG. 1. The method 800 may be implemented separately or in combination with method 700. For ease of discussion, method 800 will also be described below with reference to the network device 101 and the communication network 100 illustrated in FIG. 1. However, embodiments of the present disclosure are not limited thereto. For example, the method may be implemented by a terminal device involved in D2D communication in some scenarios.

As shown in FIG. 8, at block 810, the network device 101 transmits a scheduling message to a terminal device 102. The scheduling message may or may not be same as the scheduling message described with reference to FIG. 7. As an example rather than limitation, the scheduling message may be in a form of a DCI.

At block 820, the network device 101 transmits data, for example via PDSCH, to the terminal device 102 according to the scheduling message, and detects HARQ feedback from the terminal device 102 at block 830.

At block 840, the network device 101 determines a resource identification for a resource where the HARQ feedback is detected. The resource identification comprises an identifier for a resource set group associated with the resource. A resource set group comprises one or more resource sets, and a resource set comprises one or more resources. That is, a resource may be identified via a 3D identification, as shown in FIG. 4.

At block 850, the network device 101 controls following transmission or retransmission based on the received HARQ feedback and the resource identification. As an example without limitation, if the HARQ feedback is detected in the ith resource set group, then the network device 101 may determine that the received HARQ feedback is the ith retransmission. Then the network device 101 may determine a previous data transmission associated with the ith retransmission of a HARQ feedback, and controls retransmitting of the previous data transmission based on the received HARQ feedback. If the received HARQ feedback is an ACK, the network device 101 prevents retransmission of the previous data transmission, and if the received HARQ feedback is a NACK, the network device 101 performs retransmission of the previous data transmission. For example, in the example shown in FIG. 5, if a NACK is detected in resource 2 which belongs to resource set group 2, the network device 101 may determine that this is the $2^{nd}$ retransmission of a NACK for a PDSCH in slot n. As a result, the network device 101 retransmits the PDSCH which was previously transmitted in slot n.

Figure 9:
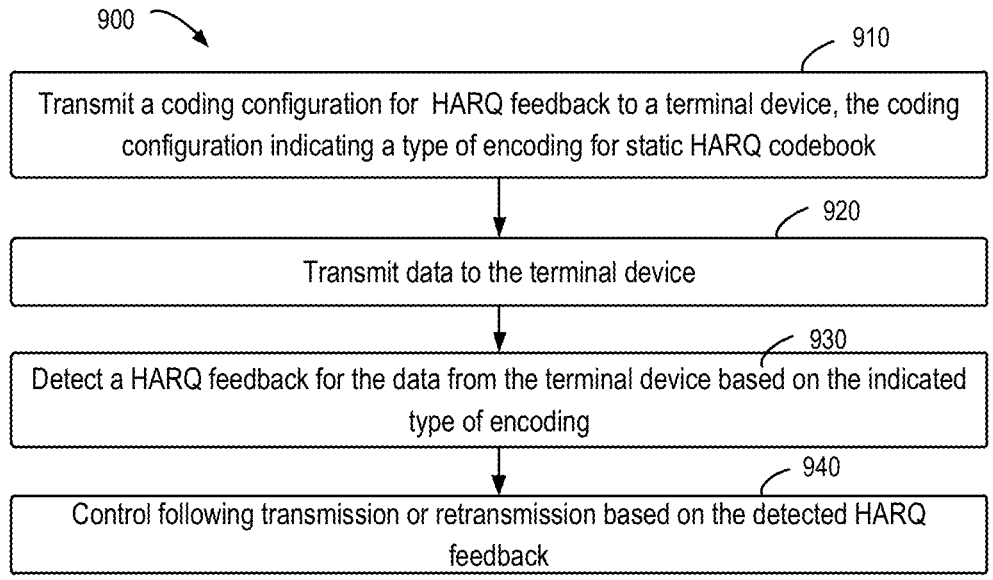

FIG. 9 shows a flow chart of another example method 900 for HARQ feedback. The method 900 may be implemented by a network device, for example, the network device 101 shown in FIG. 1. The method 900 may be implemented separately or in combination with one or more of methods 700 and 800. For ease of discussion, method 900 will also be described below with reference to the network device 101 and the communication network 100 illustrated in FIG. 1. However, embodiments of the present disclosure are not limited thereto. For example, the method may be implemented by a terminal device involved in D2D communication in some scenarios.

As shown in FIG. 9, at block 910, the network device 101 transmits a coding configuration for HARQ feedback to a terminal device 102. The coding configuration indicates a type of encoding for static HARQ codebook. As an example rather than limitation, the coding configuration may be transmitted via a RRC signaling or system information.

At block 920, the network device 101 transmits data to the terminal device 102, and detects a HARQ feedback for the data from the terminal device 102 based on the indicated type of encoding at block 930.

In some embodiments, the type of encoding may include one of a type A and type B encoding as described above with reference to FIG. 6. For illustration purpose, assuming that the network device 101 transmits the data together with a scheduling message (e.g., a DCI) to the terminal device 102 at time slot n, and the scheduling message indicates that a HARQ feedback is to be provided by the terminal device 102 at time slot n+k, where both n and k are non-negative integers, then if the type A is indicated at block 910, the network device 101 will decoding the HARQ feedback if the HARQ feedback for the data is received in time slot n+k; otherwise, if the HARQ feedback for the data is detected at a time slot other than the time slot n+k, the network device 101 will interpret the received HARQ feedback bits as a NACK. In contrast, if encoding type B is indicated at block 910, the network device 101 will decode the HARQ feedback regardless of whether the HARQ feedback is detected at the time slot n+k or another time slot. Type B encoding provides more redundancy in HARQ feedback.

At block 940, the network device 101 controls following transmission or retransmission based on the detected HARQ feedback. In some embodiments, operations similar to that used in current HARQ mechanism may be implemented at block 940.

Figure 10:
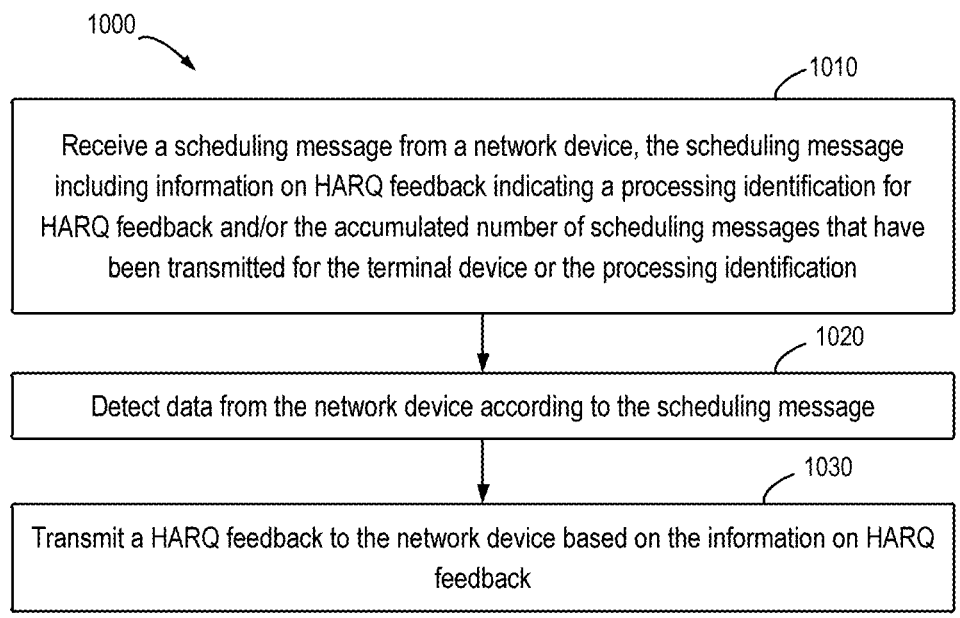
FIGS. 10-12 show flow charts of methods that may be implemented by a terminal device according to embodiments of the present disclosure.

FIG. 10 shows a flow chart of an example method 1000 for HARQ feedback. The method 1000 may be implemented by a terminal device, for example, one terminal device 102 shown in FIG. 1. For ease of discussion, method 1000 will be described below with reference to the terminal device 102 and the communication network 100 illustrated in FIG. 1. However, embodiments of the present disclosure are not limited thereto.

As shown in FIG. 10, at block 1010, terminal device 102 receives a scheduling message from the network device 101. The scheduling message includes information on HARQ feedback, and the information on HARQ feedback indicates at least one of: a processing ID for HARQ feedback, and the accumulated number of scheduling messages that have been transmitted for the terminal device or the processing identification.

In some embodiments, the scheduling message may be in a form of a DCI. In some embodiments, the scheduling message may be same as that described with reference to method 700, and therefore, relevant descriptions of method 700 also apply here.

In some embodiments, the processing ID for HARQ feedback may be in a form a HARQ PUCCH processing ID, and the accumulated number of scheduling messages may be in a form of a cycled DAI.

In some embodiments, the scheduling message may further include one or more of: an indication (e.g., a counter DAT) of the total number of scheduling messages that have been transmitted in a predetermined transmission set (e.g., a PDSCH set) associated with a same HARQ feedback time slot, an indication (e.g., a total DAI) of the total number of scheduling messages to be transmitted in the predetermined transmission set (e.g., a PDSCH set) associated with a same HARQ feedback time slot, and/or an indication (e.g., a NFI) for providing a new HARQ feedback.

At block 1020, the network device 101 according to the scheduling message (e.g., DCI), and at block 1030, the terminal device 102 transmits HARQ feedback to the network device 101 based on the information on HARQ feedback.

In some embodiments, the information on HARQ feedback may comprise a cyclic DAI indicating the accumulated number of scheduling messages (e.g., DCIs) that have been transmitted (possibly across a plurality of PDSCH sets) for the terminal device or the processing identification. In such embodiments, at block 1030, the terminal device 102 may determine total number of bits to be transmitted for HARQ feedback based on the cyclic DAI, and transmit the HARQ feedback with the determined total number of bits to the network device 101.

In some embodiments, the information on HARQ feedback may comprise a HARQ PUCCH processing ID. In such embodiments, the terminal device 102 may determine one or more previous downlink data transmissions associated with the processing ID, and transmit HARQ feedback for the detected data together with HARQ feedback for the one or more previous downlink data transmissions to the network device 101.

Figure 11:
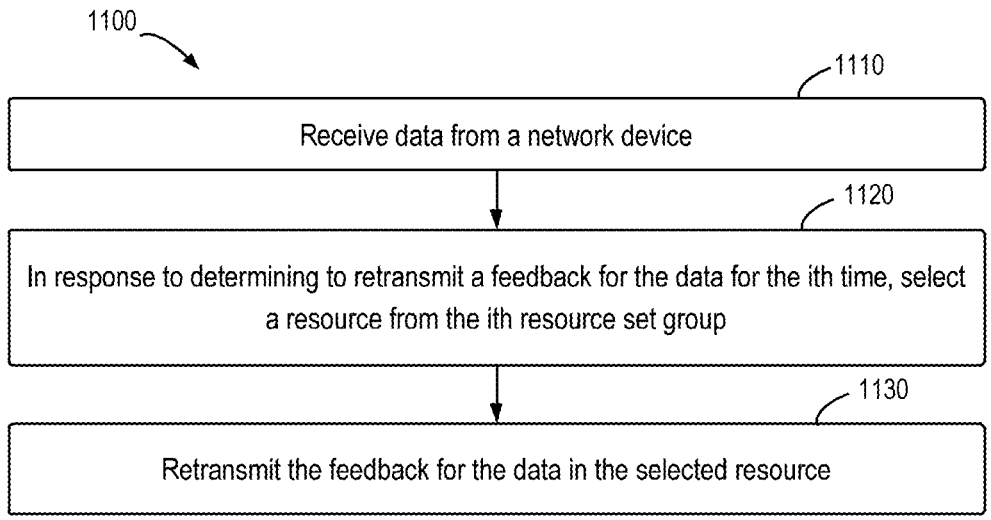

FIG. 11 shows a flow chart of another example method 1100 for HARQ feedback. The method 1100 may be implemented by a terminal device, for example, one terminal device 102 shown in FIG. 1. Note that the method 1100 may be implemented separately or in combination with method 1000. For ease of discussion, method 1200 will also be described below with reference to the terminal device 102 and the communication network 100 illustrated in FIG. 1. However, embodiments of the present disclosure are not limited thereto.

As shown in FIG. 11, at block 1110, terminal device 102 receives data from the network device 101. With a HARQ mechanism, the terminal device 102 needs to provide feedback for the received data. However, in some scenarios, for example in a NR-U communication system, the feedback may be blocked or fail due to failure of LBT in an unlicensed band. Therefore, in some cases, the terminal device 102 may decide to retransmit a HARQ feedback.

If the terminal device 102 determines to retransmit a feedback for the data for the ith time, then at block 1120, the terminal device 102 selects a resource from the ith resource set group, wherein i is a positive integer. Here a resource set group comprises one or more resource sets, and a resource set comprises one or more feedback resources.

At block 1130, the terminal device 102 retransmits the feedback for the data in the selected resource. In this way, the terminal device 102 may indicate the number of retransmissions that have been performed for a HARQ feedback to the network device 101 implicitly, in order to avoid ambiguity at the network device side.

Figure 12:
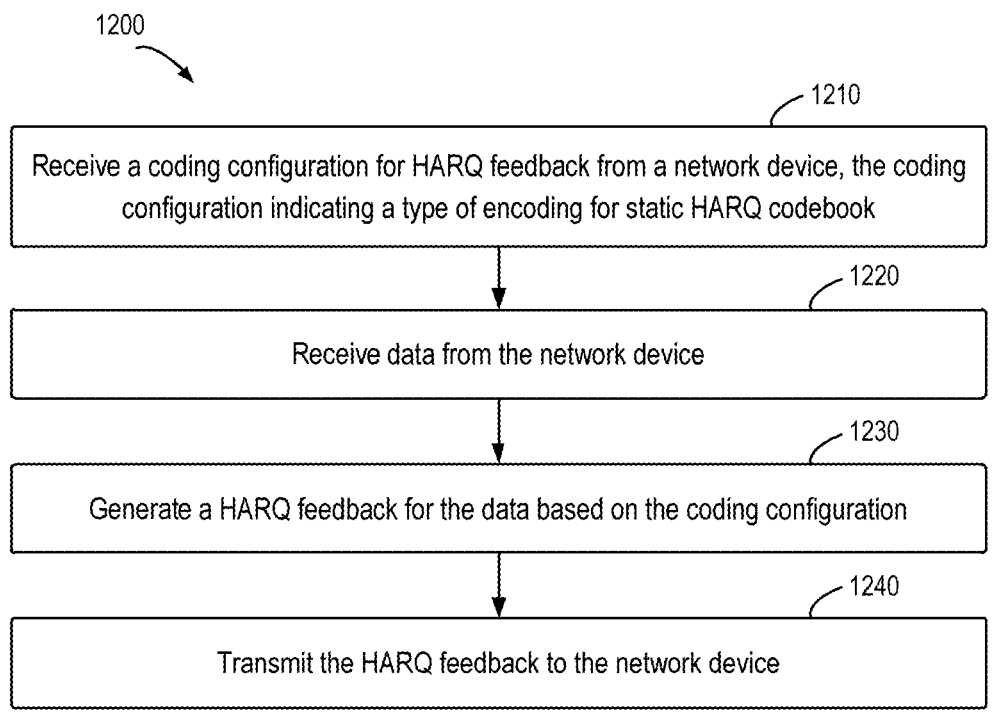

FIG. 12 shows a flow chart of another example method 1200 for HARQ feedback. The method 1200 may be implemented by a terminal device, for example, one terminal device 102 shown in FIG. 1. Note that the method 1200 may be implemented separately or in combination with one or more of methods 1000 and 1100. For ease of discussion, method 1200 will also be described below with reference to the terminal device 102 and the communication network 100 illustrated in FIG. 1. However, embodiments of the present disclosure are not limited thereto.

As shown in FIG. 12, at block 1210, terminal device 102 receives a coding configuration for HARQ feedback from the network device 101. The coding configuration indicates a type of encoding for static HARQ codebook. In some embodiments, the indicated type of encoding may include a type A or type B encoding. For example rather than limitation, the coding configuration may be received via a RRC signaling or system information.

At block 1220, the terminal device 102 receives data from the network device 101, and at block 1230, the terminal device 102 generates HARQ feedback for the data based on the coding configuration.

For example, at block 1220, the terminal device 102 may receive the data together with a scheduling message (e.g., a DCI) from the network device 101 at time slot n. The scheduling message indicates that a HARQ feedback is to be provided by the terminal device 102 at time slot n+k, where both n and k are non-negative integers.

In an embodiment where a type A encoding is configured at block 1210, if the terminal device 102 determines to transmit the HARQ feedback for the data at time slot n+k, then at block 1230, the terminal device 102 generates the HARQ feedback bit depending on a detection result of the data transmission received at time slot n. On the other hand, if the terminal device 102 determines to transmit the HARQ feedback for the data at a time slot other than the time slot n+k, then at block 1230, the terminal device 102 generates a NACK bit for the data transmission.

In some embodiments where a type B encoding is configured at block 1210, then at block 1230, the terminal device 102 generates the HARQ feedback bit depending on a detection result of the data transmission received at time slot n, regardless of whether the HARQ feedback is to be transmitted at time slot n+k or another slot.

At block 1240, the terminal device 102 transmits the generated HARQ feedback to the network device 101. As described with reference to FIG. 6, with type B encoding, the terminal device 102 may transmit HARQ feedback for a PDSCH for a plurality of times, thus providing redundancy, which enables the network device 101 to recover the HARQ feedback even when one of the transmissions fails.

It can be appreciated from the above embodiment that UE may be configured to use type A or type B encoding for HARQ feedback in response to a PDSCH received at slot n, and if the UE reports HARQ-ACK information for the PDSCH reception in a slot other than slot n+k, the UE sets a value for each corresponding HARQ-ACK information bit to NACK when type A is configured and to HARQ-ACK information bit(s) when type B is configured, where the value of k may be indicated in a DCI associated with the PDSCH in slot n.

Figure 13:
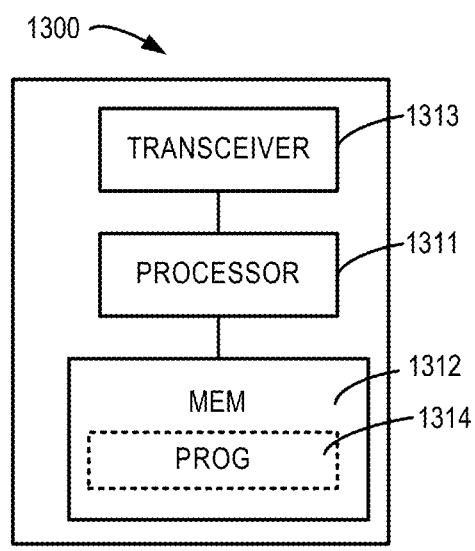
FIG. 13 illustrates a simplified block diagram of an apparatus that may be embodied as/comprised in a terminal device, or a network device according to embodiments of the present disclosure.

FIG. 13 illustrates a simplified block diagram of an apparatus 1300 that may be embodied as/comprised in a terminal device (for example, a terminal device 102 shown in FIG. 1) or a network device (for example, the network device 101 shown in FIG. 1).

The apparatus 1300 comprises at least one processor 1311, such as a data processor (DP) and at least one memory (MEM) 1312 coupled to the processor 1311. The apparatus 1300 may further include a transmitter TX and receiver RX 1313 coupled to the processor 1311, which may be operable to communicatively connect to other apparatuses. The MEM 1312 stores a program or computer program code 1314. The at least one memory 1312 and the computer program code 1314 are configured to, with the at least one processor 1311, cause the apparatus 1300 at least to perform in accordance with embodiments of the present disclosure, for example any of methods 700-1200.

A combination of the at least one processor 1311 and the at least one MEM 1312 may form processing means configured to implement various embodiments of the present disclosure.

Various embodiments of the present disclosure may be implemented by computer program executable by the processor 1311, software, firmware, hardware or in a combination thereof.

The MEM 1312 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processor 1311 may be of any type suitable to the local technical environment, and may include one or more of general purpose computers, special purpose computers, microprocessors, digital signal processors (DSPs) and processors based on multicore processor architecture, as non-limiting examples.

In addition, the present disclosure may also provide a carrier containing the computer program as mentioned above. The carrier includes a computer readable storage medium and a transmission medium. The computer readable storage medium may include, for example, an optical compact disk or an electronic memory device like a RAM (random access memory), a ROM (read only memory), Flash memory, magnetic tape, CD-ROM, DVD, Blue-ray disc and the like. The transmission medium may include, for example, electrical, optical, radio, acoustical or other form of propagated signals, such as carrier waves, infrared signals, and the like.

The techniques described herein may be implemented by various means so that an apparatus implementing one or more functions of a corresponding apparatus described with an embodiment comprises not only prior art means, but also means for implementing the one or more functions of the corresponding apparatus and it may comprise separate means for each separate function, or means that may be configured to perform two or more functions. For example, these techniques may be implemented in hardware (e.g., circuit or a processor), firmware, software, or combinations thereof. For a firmware or software, implementation may be made through modules (e.g., procedures, functions, and so on) that perform the functions described herein.

Some example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, may be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments may also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept may be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

Some abbreviations used in the present disclosure and their corresponding expressions are list below:
3GPP 3rd generation partnership project
LTE Long Term Evolution
NR New Radio
NR-U NR-unlicensed
LAA LTE Licensed Assisted Access
HARQ Hybrid automatic repeat request
PUCCH Physical Uplink Control Channel
PUSCH Physical Uplink Shared Channel
PDSCH Physical Downlink Shared Channel
DCI Downlink control indicator
UCI Uplink Control Information
ACK Acknowledgement
NACK Negative Acknowledgement
CCA Clear Channel Assessment
LBT Listen Before Talk
COT Channel Occupied Time
C-RNTI Cell Radio Network Temporary Identity

What is claimed is:

1. A method for wireless communication, comprising:
transmitting a scheduling message to a terminal device;
transmitting data to the terminal device according to the scheduling message;
detecting a hybrid automatic repeat request, HARQ, feedback from the terminal device;
determining a resource identification for a resource where the HARQ feedback is detected, the resource identification comprising an identifier for a resource set group associated with the resource, wherein a resource set group comprises one or more resource sets, and a resource set comprises one or more resources; and
controlling following transmission or retransmission based on the received HARQ feedback and the resource identification,
wherein controlling following transmission or retransmission based on the received HARQ feedback and the resource identification comprises:
in response to the identifier for the resource set group indicating the ith resource set group, determining that the received HARQ feedback is the ith retransmission of a HARQ feedback;
determining a previous data transmission associated with the ith retransmission of the HARQ feedback; and
controlling retransmitting of the previous data transmission based on the received HARQ feedback.

2. The method of claim 1, wherein controlling retransmitting of the previous data transmission based on the received HARQ feedback comprises:
in response to the received HARQ feedback being a positive acknowledgement, ACK, preventing retransmission of the previous data transmission; and
in response to the received HARQ feedback being a negative acknowledgement, NACK, performing retransmission of the previous data transmission.

3. A method for wireless communication, comprising:
transmitting a coding configuration for hybrid automatic repeat request, HARQ, feedback to a terminal device, the coding configuration indicating a type of encoding for static HARQ codebook; and
transmitting data to the terminal device;
detecting a HARQ feedback for the data from the terminal device based on the indicated type of encoding; and
controlling following transmission or retransmission based on the detected HARQ feedback,
wherein the type of encoding includes one of a first encoding type and a second encoding type, and wherein transmitting data to the terminal device comprises:
transmitting the data together with a scheduling message to the terminal device at a time slot n, the scheduling message indicating that a HARQ feedback is to be provided by the terminal device at a time slot n+k, where both n and k are non-negative integers; and
wherein detecting the HARQ feedback comprises:
in response to the first encoding type being indicated,
in response to detecting the HARQ feedback for the data at the time slot n+k, decoding the HARQ feedback; and
in response to detecting the HARQ feedback for the data at a time slot other than the time slot n+k, interpreting the received HARQ feedback as a negative acknowledgement, NACK; and
in response to the second encoding type being indicated, decoding the HARQ feedback regardless of whether the HARQ feedback is detected at time slot n+k or another time slot.

4. A computer readable storage medium with a computer program stored thereon which, when executed by a processor, causes the processor to carry out the method of claim 3.

5. An apparatus for wireless communication, comprising a processor and a memory, said memory containing instructions executable by said processor whereby said apparatus is operative to perform a method according to claim 3.

6. A method implemented by a terminal device for wireless communication, comprising:
receiving a scheduling message from a network device, the scheduling message including information on hybrid automatic repeat request, HARQ, feedback, the information on HARQ feedback indicating: a processing identification for HARQ feedback and accumulated number of scheduling messages that have been transmitted for the processing identification;
detecting data from the network device according to the scheduling message; and
transmitting a HARQ feedback to the network device based on the information on HARQ feedback,
wherein the information on HARQ feedback comprises a cyclic downlink assignment index, DAI, indicating the accumulated number of scheduling messages that have been transmitted for the terminal device or the processing identification; and
wherein transmitting the HARQ feedback to the network device based on the information on HARQ feedback comprises:
determining the total number of bits to be transmitted for the HARQ feedback based on the cyclic DAI; and
transmitting the HARQ feedback with determined total number of bits to the network device.

7. The method of claim 6, wherein the scheduling message further including one or more of:
an indication of the total number of scheduling messages that have been transmitted in a predetermined transmission set associated with a same HARQ feedback time slot;
an indication of the total number of scheduling messages to be transmitted in the predetermined transmission set associated with a same HARQ feedback time slot; and
an indication for providing a new HARQ feedback.

8. The method of claim 6, wherein the scheduling message comprises downlink control information, DCI.

9. An apparatus for wireless communication, comprising a processor and a memory, said memory containing instructions executable by said processor whereby said apparatus is operative to perform a method according to claim 6.

10. A computer readable storage medium with a computer program stored thereon which, when executed by a processor, causes the processor to carry out the method of claim 6.

11. A method implemented by a terminal device for wireless communication, comprising:
  receiving a scheduling message from a network device, the scheduling message including information on hybrid automatic repeat request, HARQ, feedback, the information on HARQ feedback indicating: a processing identification for HARQ feedback and accumulated number of scheduling messages that have been transmitted for the processing identification;
  detecting data from the network device according to the scheduling message; and
  transmitting a HARQ feedback to the network device based on the information on HARQ feedback,
  wherein the information on HARQ feedback comprises a processing identification for HARQ feedback, and
  wherein transmitting the HARQ feedback to the network device based on the information on HARQ feedback comprises:
  determining one or more previous downlink data transmissions associated with the processing identification; and
  transmitting a HARQ feedback for the detected data together with a HARQ feedback for the one or more previous downlink data transmissions to the network device.

12. A method for wireless communication, comprising:
  receiving a coding configuration for hybrid automatic repeat request, HARQ, feedback from a network device, the coding configuration indicating a type of encoding for static HARQ codebook;
  receiving data from the network device;
  generating a HARQ feedback for the data based on the coding configuration; and
  transmitting the HARQ feedback to the network device,
  wherein the type of encoding includes one of a first encoding type and a second encoding type, and
  wherein receiving data from the network device comprises:
  receiving the data together with a scheduling message from the network device at time slot n, the scheduling message indicating that a HARQ feedback is to be provided by the at time slot n+k, where both n and k are non-negative integers; and
  wherein generating the HARQ feedback for the data based on the coding configuration comprises:
  in response to the first encoding type being indicated,
  in response to determining to transmit the HARQ feedback for the data at a time slot n+k, generating the HARQ feedback bit depending on a detection result of the data transmission received at time slot n;
  in response to determining to transmit the HARQ feedback for the data at a time slot other than the time slot n+k, generating a negative acknowledgement, NACK, bit for the data transmission; and
  in response to the second encoding type being indicated, generating the HARQ feedback bit depending on the detection result of the data transmission received at time slot n regardless of whether the HARQ feedback is to be transmitted at time slot n+k or another time slot.

* * * * *